US010175146B2

(12) United States Patent
Braghiroli et al.

(10) Patent No.: US 10,175,146 B2
(45) Date of Patent: Jan. 8, 2019

(54) DEVICE FOR LIFTING AT LEAST ONE VEHICLE WHEEL OR TYRE, WITH DETECTOR OF THE STATE OF WEAR OF THE LATTER

(71) Applicant: SNAP-ON EQUIPMENT S.R.L., Correggio (Reggio Emilia) (IT)

(72) Inventors: Francesco Braghiroli, Reggio Emilia (IT); Lillo Gucciardino, Bomporto (IT); Paolo Sotgiu, Modena (IT); Marco Tralli, Modena (IT)

(73) Assignee: SNAP-ON EQUIPMENT S.R.L., Correggio (Reggio Emilia) (IT)

( * ) Notice: Subject to any disclaimer, the term of this patent is extended or adjusted under 35 U.S.C. 154(b) by 62 days.

(21) Appl. No.: 15/018,712

(22) Filed: Feb. 8, 2016

(65) Prior Publication Data

US 2016/0231203 A1    Aug. 11, 2016

(30) Foreign Application Priority Data

Feb. 9, 2015    (IT) .............................. MI2015A0174

(51) Int. Cl.
| | | |
|---|---|---|
| *G01M 17/00* | (2006.01) | |
| *G01M 17/02* | (2006.01) | |
| *B66F 7/28* | (2006.01) | |
| *G01M 1/02* | (2006.01) | |
| *G01M 17/013* | (2006.01) | |

(52) U.S. Cl.
CPC ............. *G01M 17/027* (2013.01); *B66F 7/28* (2013.01); *G01M 1/02* (2013.01); *G01M 17/013* (2013.01); *G01M 17/021* (2013.01)

(58) Field of Classification Search
None
See application file for complete search history.

(56) References Cited

U.S. PATENT DOCUMENTS

| | | | | |
|---|---|---|---|---|
| 4,275,589 A | * | 6/1981 | Dugger ............... | G01M 17/025 |
| | | | | 73/146 |
| 4,365,514 A | * | 12/1982 | Ho ...................... | G01M 17/025 |
| | | | | 73/40.5 A |
| 8,171,783 B2 | | 5/2012 | Tracy | |
| 9,261,434 B2 | * | 2/2016 | Wollbrinck ......... | G01M 17/021 |
| 9,417,157 B2 | * | 8/2016 | Buzzi .................... | G01M 1/045 |
| 2001/0022802 A1 | * | 9/2001 | Kurata ................ | G01M 17/027 |
| | | | | 374/45 |
| 2008/0297777 A1 | * | 12/2008 | Sotgiu ................. | B60C 25/0554 |
| | | | | 356/139.09 |

(Continued)

FOREIGN PATENT DOCUMENTS

| | | |
|---|---|---|
| EP | 0982566 A2 | 3/2000 |
| EP | 2113762 A2 | 11/2009 |

OTHER PUBLICATIONS

Research Report Italian Patent Application No. MS2015A0000174.

*Primary Examiner* — Andre Allen
(74) *Attorney, Agent, or Firm* — McDermott Will & Emery LLP

(57) ABSTRACT

A lifting device (10, 40) for at least one wheel (8) of a vehicle or for a tire (6), said device (10, 40) comprising at least one platform (12, 41, 42) on which the wheel (8) or tire (6) moves, said platform (12) being liftable relative to a fixed surface (P). The movable platform (12) is associated with a laser scanner (20) for detecting the state of wear of the tire (6).

17 Claims, 3 Drawing Sheets

(56) References Cited

U.S. PATENT DOCUMENTS

| | | | |
|---|---|---|---|
| 2010/0000310 A1* | 1/2010 | Braghiroli | G01B 11/22 |
| | | | 73/146 |
| 2010/0180676 A1* | 7/2010 | Braghiroli | G01M 17/027 |
| | | | 73/146 |
| 2014/0270466 A1* | 9/2014 | Dam | G01M 17/027 |
| | | | 382/141 |
| 2014/0311231 A1* | 10/2014 | Braghiroli | G01M 1/04 |
| | | | 73/146 |
| 2016/0075196 A1* | 3/2016 | Corghi | B60C 25/056 |
| | | | 157/1.24 |
| 2016/0236430 A1* | 8/2016 | Frelicot | B29D 30/0633 |
| 2016/0245725 A1* | 8/2016 | Braghiroli | G01B 11/026 |
| 2017/0052021 A1* | 2/2017 | Rhoades | G01B 11/22 |

* cited by examiner

DEVICE FOR LIFTING AT LEAST ONE VEHICLE WHEEL OR TYRE, WITH DETECTOR OF THE STATE OF WEAR OF THE LATTER

This Application claims priority to Italian Patent Application No. MI2015A000174 filed Feb. 9, 2015. The subject matter of which is incorporated herein by reference in entirety.

The present invention relates to a lifting device according to the preamble of the principal claim.

Lifting devices for vehicle wheels or for tyres have been known for some time. These devices are usually associated with tyre changing or balancing machines, or form parts of these. However, the term "lifting device" is intended to include any platform having a flat part on which the wheel or tyre moves (by rolling), regardless of whether the tyre is detached from a vehicle or associated therewith. A "lifting device" therefore also includes a vehicle lift having two parallel ramps on which a vehicle is positioned for lifting.

In any case, a feature common to every lifting device is that it has a platform which is movable relative to a surface on which the vehicle or the tyre changing or balancing machine is positioned.

There are also known devices for detecting the state of wear, or more generally the condition, of a wheel or tyre, including the presence of any defectiveness, these devices usually comprising a laser scanner capable of "reading" at least a part of the tyre, particularly the tread and/or the lateral surfaces, while the wheel is positioned in front of the scanner or is made to rotate in front of it.

More particularly, a laser scanner, such as a "Stripe of Light" (SOL) laser, is capable of determining in a precise way the geometry of the wheel (the rim and the tyre) and can provide a comprehensive diagnosis of the wheel, for example in order to detect possible defectiveness, ovalization, irregular wear, etc., in the tyre.

An example of the use of an SOL device is reported in EP2211161, in which a plurality of laser generators are associated with a movable support unit which can be positioned next to a vehicle wheel: by activating these generators (associated with a U-shaped structure of the support) and rotating the wheel (or the tyre), it is possible to detect the state of both the tread and the sidewalls.

Another device capable of detecting the state of wear of a tyre is described in U.S. Pat. No. 6,789,416: this comprises a body having an opening in which the wheel or tyre is positioned, at which opening a laser scanner can "read" the surface of the tyre to check its wear. A similar device is described in WO2010/100417.

In the aforementioned devices, the data corresponding to a full revolution of the wheel must be acquired in order to provide a complete diagnosis of the tyre (or of its tread, for example). This can be done in only two ways: either by rotating the wheel or tyre, or by moving the device (if manual) around the whole circumference of the tyre.

Other devices for diagnosing the wear of a tyre are described, for example, in U.S. Pat. No. 8,171,783, US2012/0067115, WO2014/094703 and WO2014/095142, although these are fixed devices. All these devices substantially disclose one or more fixed laser scanners with respect to which a vehicle wheel moves. For example, U.S. Pat. No. 8,171,783 describes a unit having a configuration such that, during movement, the vehicle wheel bears against a corresponding scanner which thus records the wear of the tyre tread.

US2012/0067115 describes a method for determining the depth of tread of a tyre while it rotates on, or is placed on, a measuring station.

The aforementioned solutions define what are known as "drive-over" systems, that is to say systems in which a vehicle is made to pass over a measuring station having one or more laser scanners. However, these solutions cannot acquire data relating to the whole circumference of the wheel, as those mentioned previously can (those which are used manually, for example); however, they can provide general indications of the state of the tyre, such as the wear on the tyre or its tread, as well as the pressure of the tyre. On the basis of this information, and particularly that relating to wear, it is possible to obtain an indication of the need to change the tyre or to perform an operation to correct the attitude of the vehicle (by correcting the wheel alignment, for example) or other common operations which are performed according to the wear detected on the tyre.

However, the last-mentioned solutions relate to devices (capable of detecting the state of wear of tyres) which are fixed and are often large, and which therefore require a significant amount of space for their installation. Moreover, their installation and maintenance costs are also significant.

EP2113761 describes a balancing machine for balancing vehicle wheels, comprising a base frame supporting a rotating spindle placed at one side of a wheel support surface. This surface can be lifted to bring the wheel from a position close to a lower base to the position of this spindle. A wall rises from the base at one side of the movable support, means of reading the position of the wheel relative to the spindle being fixed to this wall. These reading means are an optical sensor of the laser type which can be used to determine when, as a result of the lifting of the support surface, the wheel placed on the latter has reached position such that the wheel can be slid on to the spindle.

The position of the wheel is determined by the interaction of the laser beam generated by the sensor with the profile of the tyre.

This prior art does not tackle the problem of determining the state of wear and/or the surface condition and/or the defectiveness of a tyre, but it does tackle the problem of automatically determining when a wheel to be subjected to balancing has been lifted from the ground so that it can easily be fitted on to the spindle of the balancing machine by an operator.

In particular, the laser beam emitted by the optical sensor described in EP2113761 does not read the state of the tyre, but solely detects the spatial position of the wheel relative to the rotating spindle.

Additionally, the optical sensor generating the laser beam is placed remotely from the wheel support surface, on a wall placed at the side of this surface. This laser beam can interact with the wheel solely when the support surface has been lifted from the base, and it is only in this condition that the laser beam can strike the wheel and identify its position.

EP0982566 describes a method for aligning the wheels of a vehicle placed on suitable rotating devices, on the basis of the forces generated by the rolling of the aforesaid wheels on these devices. These rotating devices are associated with platforms of a vehicle lift and the vehicle wheels are positioned on these devices. By activating these devices, the alignment of the wheels is determined on the basis of suitable force sensors associated with the structure of each device. The aforesaid sensor is capable of measuring a stress or a strain generated on the aforesaid structure by a wheel which is misaligned in its rolling motion on the platforms of the lift.

Consequently, EP0982566 does not tackle the problem of determining the state of wear and/or the surface condition and/or the defectiveness of a tyre, but only that of the alignment of the wheels of a vehicle with said wheels kept mounted on the vehicle.

Furthermore, EP0982566 determines this alignment or misalignment by using, for each rotating device, a force sensor which detects the movement of relatively movable structural parts of this device. This sensor (a load cell or the like) cannot be an optical sensor, since this sensor would not be capable of detecting the forces exerted between the relatively movable structural parts when a wheel in motion, whose alignment or misalignment is to be determined, is present on the device.

The object of the present invention is to allow the automatic detection of the state of wear and/or the condition and/or the defectiveness of a tyre simultaneously with the execution of other operations performed on the latter, such as the operation of mounting the tyre on the respective rim and detaching it therefrom, the balancing of a wheel, the correction of the attitude of the wheels of a vehicle, or others.

Another object is to carry out these detections when the normal lifting of the wheel or the tyre alone is performed for the execution of these operations, this lifting being capable (in the widest sense) of being carried out even when the wheel is still associated with the vehicle (for example, by means of ordinary vehicle lifts on which the vehicle is placed for the detachment of the wheel or for the checking of the attitude of the vehicle, for example by using alignment machines, or for other operations).

An object of the invention is therefore to provide a device for lifting at least one wheel of a vehicle, which can also be used, simultaneously or in combination with the lifting operations, to obtain data on the wear and/or the condition and/or the defectiveness of the tyre.

Another object is to provide a device of this type which can be used to obtain data on the wear and/or condition and/or defectiveness, which can be used by a tyre specialist for subsequent operations to be performed on the wheel.

A further object is to provide a device of this type which is capable of supplying said information on the wear and/or condition and/or defectiveness of the tyre directly to a tyre changing machine, to a balancer, to an alignment machine, or other.

Another object is to provide a device of this type which can be used to obtain data on the wear and/or condition and/or defectiveness of the tyre which can be, for example, presented to the driver of the vehicle to which the tyre belongs, preferably in the form of three-dimensional colour images of the tyre tread, as illustrated in EP2110656 and U.S. Pat. No. 7,269,997.

A further object is to provide a device of this type which can be used to obtain data on the wear and/or condition and/or defectiveness of the tyre which can be stored for future comparison with uniform data in order to detect any problems in the tyre or in the aforesaid vehicle, for example in order to estimate the remaining mileage of the tyre, as illustrated in EP2141475.

These and other objects, which will be evident to those skilled in the art, are achieved by a lifting device according to the attached claims.

To facilitate the understanding of the present invention, the following drawings are appended purely by way of non-limiting examples, in which drawings.

Figure 1:
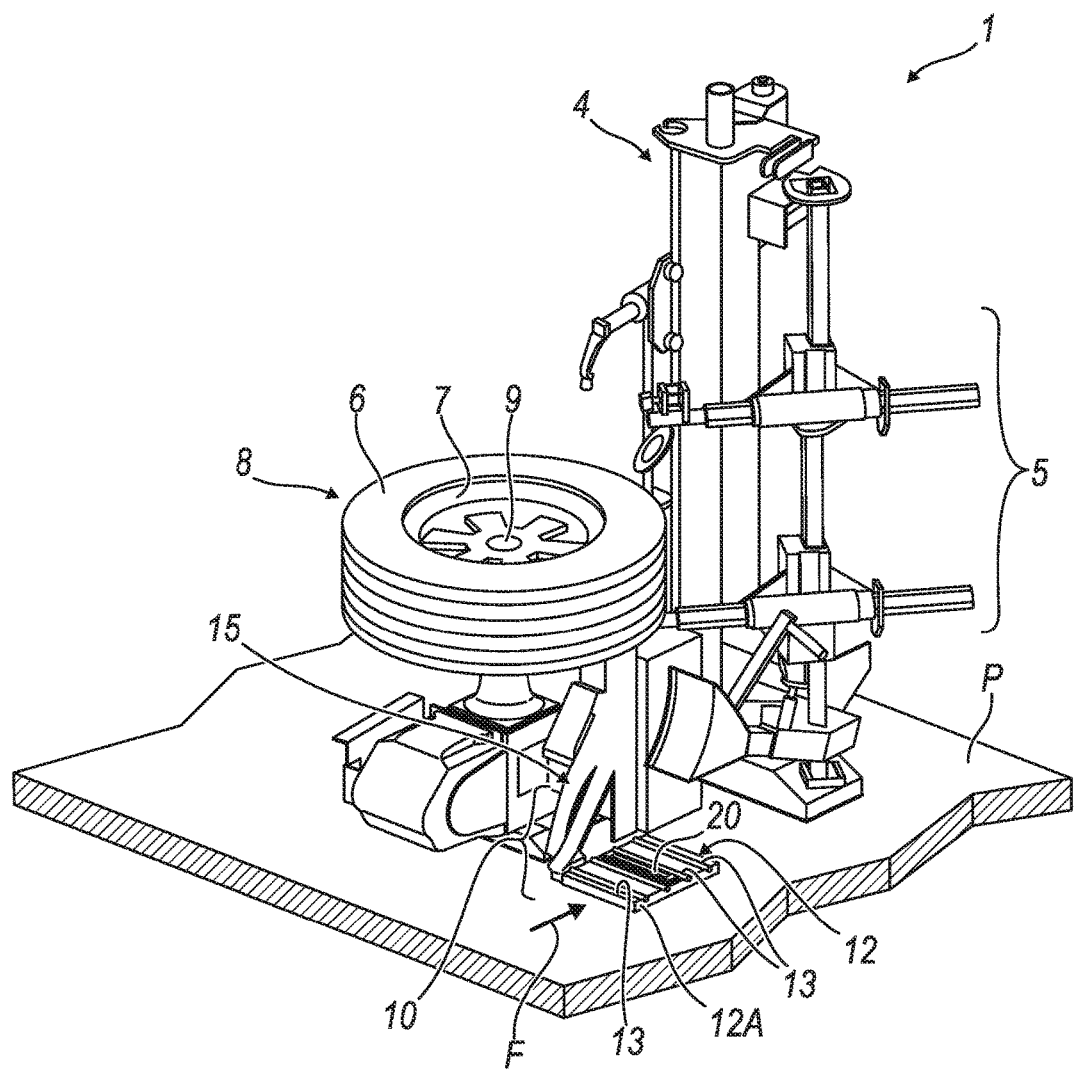
FIG. 1 shows a perspective view of a tyre changing machine equipped with a device according to the invention.
Figure 2:
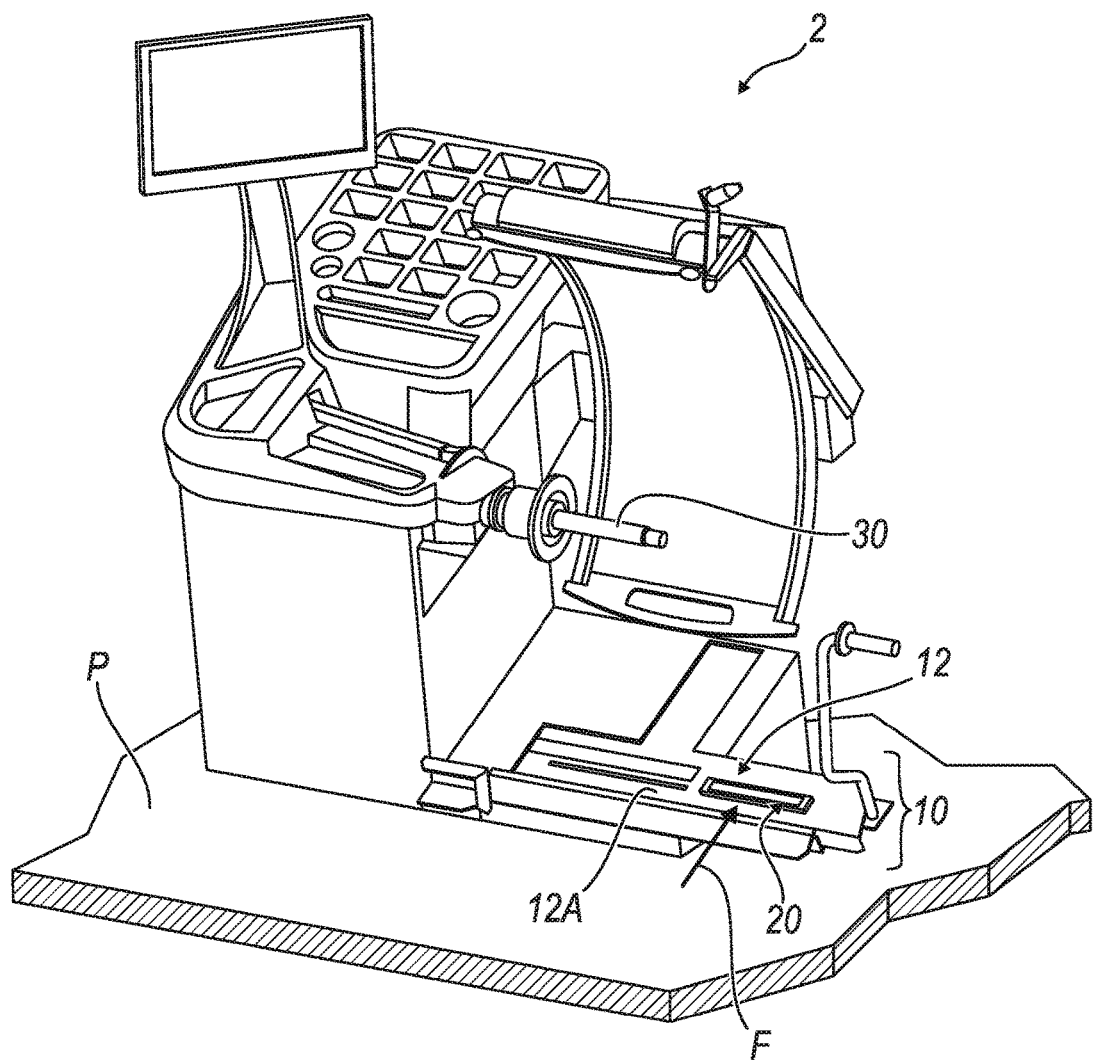
FIG. 2 shows a perspective view of a balancing machine equipped with a device according to the invention.

With reference to the aforementioned figures, and in particular to FIGS. 1 and 2, these show, respectively, a tyre changing machine 1 and a balancing machine 2. These are of a known type and will be described solely in relation to the characteristics of the present invention.

In particular, the tyre changing machine 1 comprises a column 4 associated with the usual components (indicated as a whole by 5) for separating a tyre 6 from a rim 7, the assembly of these two elements forming a wheel 8.

The machine 1 comprises a platform of the usual type with a rotating central pivot 9 for supporting the wheel 8 and a lifting device 10 for carrying this wheel from a surface P (on which the machine 1 rests) to an operating height such that the wheel can be placed on the pivot 9. The device 10 comprises a platform 12, preferably (but not necessarily) equipped with a plurality of rollers 13 in a substantially flat part 12A of the platform, these rollers being placed orthogonally to the direction of movement of the wheel 8 on the surface P (arrow F in FIG. 1), this movement being executed in order to place the wheel on the platform 12 of the machine 1. The platform 12 is associated with an arm 15 capable of lifting the wheel until it is brought to the operating height. When the platform (supporting the wheel) reaches this height, a tyre changing operative rotates the wheel through 90° so that it bears on the platform with the pivot 9 (which is commonly horizontal). However, the scope of the present invention also includes a machine 1 in which the operation of rotating the wheel is carried out automatically by the lifting device 10.

In any case, regardless of the procedure for moving the wheel to the operating height, the lifting device 10 has a platform 12 whose width (measured parallel to the rollers 13) is such that it accommodates the whole tyre tread.

According to the invention, this platform supports a laser scanner 20 for detecting the geometry and/or the state of wear and/or the condition and/or the defectiveness of the tyre. The scanner 20 is generally constructed by using known systems, for example point lasers, as described in EP1515129, or preferably, but not necessarily, "stripe of light" (SOL) lasers, as described in EP2020594 for example, and is fastened to the platform and preferably placed in a direction orthogonal to that of the rolling of the wheel (arrow F) when the latter is placed on the aforesaid platform, so that it can "read" at least a portion of the tyre tread. Preferably, this scanner 20 is placed between two rollers 13, if these are provided. Preferably, the scanner 20 is configured so that it can "read" the whole width of the tyre tread; even more preferably, it can also "read" the lateral surfaces of the tyre, or at least a portion thereof.

The laser scanner 20 can acquire data corresponding to at least one rotary position of the wheel or of the tyre (that is to say, an arc of the tyre tread); preferably, the scanner can acquire data corresponding to a plurality of rotary positions of the wheel or tyre.

In all cases, the laser scanner 20 is of a type known in the prior art, and will not be described further. It may be connected (by cable, or remotely, for example by Wi-Fi or other similar procedures) to a printer, to a data processing unit, or to the control unit of the machine 1.

In the first case, a print-out on paper can be generated from the reading of the tread, providing information on the state of the tread, and possibly also indicating, if this state is not optimal, the need to replace the tyre or to perform other maintenance operations (such as attitude correction or the like). In the second case, instead of being printed (or in addition to being printed), the detected data can be processed (for example, by comparison with standard wear data or data previously detected on the same wheel, for example in order to estimate the remaining mileage of the tyre), so as to provide the tyre specialist with more detailed diagnostic information, such as the necessity of correcting the attitude of the vehicle, balancing the wheel, or similar operations. The detected data can be stored in a database to allow comparison at the time of a subsequent operation performed by the tyre specialist on the wheel or related to the tyre manufacturer.

In the third case, in which the laser scanner 20 is connected to a control unit of the machine 1, the detected data can also be used to actuate a particular operation of the machine itself.

Finally, the detected data could also be sent via a remote connection (via Wi-Fi or the internet, for example) to a portable electronic device such as a smartphone or tablet (preferably connected to the internet) to which the tyre specialist has access and with which he can contact the vehicle owner, in order to send the aforesaid data to the latter (by email, for example) together with any necessary advice concerning operations to be performed on the wheel or tyre (such as its replacement).

In the embodiment of FIG. 2, the invention is applied to a balancing machine 2. In this figure, parts corresponding to, or described in relation to, FIG. 1 are indicated by the same reference numerals. In the embodiment of FIG. 2, the wheel is brought on to the support skid 12A of the platform 12 by movement as shown by the arrow F, and, after this platform has been lifted towards the operating height or level, is fitted on a rotating spindle 30 parallel to the platform. In one embodiment, the support skid 12A of the platform 12 is substantially V-shaped, in order to accommodate the vehicle wheel more satisfactorily. Additionally, this support skid 12A is horizontally slidable on the platform 12 from a lifting position near the end of the platform 12, on the right in FIG. 2, in other words distant from the balancing machine 2, to an operating position (not shown) at the opposite end of the platform 12, on the left in FIG. 2, in other words near the balancing machine 2. The operation of the platform 12 and its interactions with the balancing machine 2 are described, for example, in ITBO2014A000183.

The wheel 8 (not shown in the figures) is then made to rotate about its central axis (coinciding with that of the spindle 30) so that the tests relating to the balancing machine can be conducted. During this rotation, the platform 12 is moved away from the wheel 8, but can be held, at least for a limited period, at a short distance from it. During this period, the wheel 8 is rotated at low speed, for example at a speed in the range from 2 to 100 r.p.m., preferably from 5 to 50 r.p.m., or even more preferably from 10 to 30 r.p.m., for example 20 r.p.m., so that the laser scanner 20 associated with said platform reads the state of wear and/or the condition and/or the defectiveness of the tread or sidewalls of the tyre, along the whole circumference of the tyre.

These data relating to the wear and/or condition and/or defectiveness of the tyre can then be associated, in the control unit of the balancer 2, with the respective angular reading positions, by means of known and widely used arrangements.

In one embodiment, these data can be used to determine the non-uniformity of the loaded wheel by load simulation, as illustrated, for example, in EP2587214 or EP2771643.

Alternatively, the scanner 20 can read the data relating to the wear of the tyre while the platform 12 is still in a fully lowered position, while the wheel is made to roll on the skid 12A by an operator, by a procedure similar to that of the embodiment of FIG. 1. In this case, the data acquired do not correspond to the whole circumference of the wheel or the tyre, but to at least one rotary position of the wheel or tyre, and preferably to a plurality of rotary positions of the wheel or tyre.

The data that have been read can be processed as stated above in relation to the solution of FIG. 1.

In a variant, one or more further laser scanners (not shown) can be associated with the structure of the machine to additionally read the state of wear and/or the condition and/or the defectiveness of the sidewalls of the tyre. The data that have been read are then used and/or displayed as described above in relation to FIG. 1.

Figure 3:
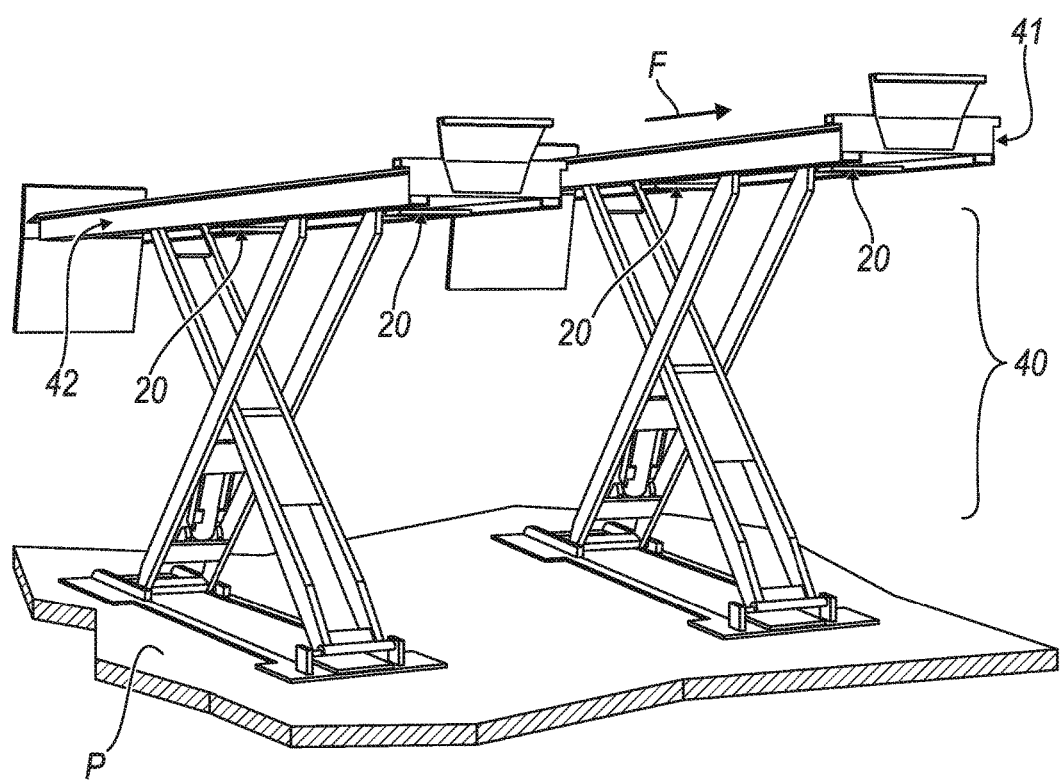
FIG. 3 shows a perspective view of a vehicle lift according to the invention.

According to a further variant of the invention, one or more laser scanners 20 are associated with the vehicle lifting device 40, as shown by way of example in FIG. 3. In this case, preferably, each platform 41, 42 of this lift is associated with at least one laser scanner 20 (two in FIG. 3) positioned transversely to the direction of movement of a vehicle (not shown) rising on this lift (arrow F in FIG. 3).

By means of this laser scanner 20, data are automatically read as the vehicle moves, and these data can then be used for operations performed on the wheels (such as attitude correction) or for action on the wheels for the purpose of overcoming, for example, non-uniform wear. For this purpose, each laser scanner 20 is connected (by an electrical or optical cable or the like, or remotely via Wi-Fi, for example) to the (ordinary) control unit of one of the machines of FIGS. 1 and 2, or to an alignment machine or other devices for the maintenance of the wheels or the vehicle, or to a printer or other electronic devices for recording data in digital format.

The fitting of each laser scanner 20 to the lift 1 (of an ordinary type) is simple, and requires minimal work on the platform 41, 42, to form apertures in the latter where the scanners are positioned.

A plurality of embodiments of the invention have been described. Evidently, a person skilled in the art will be able to devise other solutions on the basis of the above description, such as one in which the laser scanner 20 is removably associated with the platform 12 of the machines 1 and 2 and forms an optional device for these machines which can be fitted when necessary and when desired. These solutions are also to be considered as falling within the scope of the claims below.

The invention claimed is:

1. A lifting device for at least one wheel of a vehicle or for a tire, said device comprising:
   at least one platform on which the wheel or tire moves, said platform being liftable relative to a fixed surface; and
   a laser scanner on the platform and configured to detect one or more of a state of wear, condition, and defectiveness of at least a portion of tread and/or of a lateral surface of the tire in at least one rotary position of the wheel or tire,
   wherein the lifting device is associated with a tire changing machine or a balancing machine.

2. A lifting device according to claim 1, wherein the lifting device is associated with a tire changing machine.

3. A lifting device according to claim 1, wherein the lifting device is associated with a balancing machine.

4. A lifting device according to claim 1, wherein the laser scanner is connected to a control unit of a tire changing machine or a balancing machine.

5. A lifting device according to claim 4, wherein data read by said laser scanner are used by the control unit to control the operation of the tire changing machine or balancing machine.

6. A lifting device according to claim 1, wherein at least one laser scanner is associated with each platform of a vehicle lift.

7. A lifting device according to claim 1, wherein at least one laser scanner is positioned orthogonally to the direction of movement of the wheel or tire on the platform.

8. A lifting device according to claim 3, wherein the lifting device is associated with a balancing machine, and said platform is separated from the wheel or tire when the state of wear and/or the condition and/or the defectiveness of the tire is being detected.

9. A lifting device according to claim 8, wherein the state of wear and/or the condition and/or the defectiveness of the tire is detected over the whole circumference of the tire which is made to rotate by said balancing machine.

10. A lifting device according to claim 2, wherein the laser scanner is connected to a printer capable of printing detected data on the wear and/or condition and/or defectiveness, or data related thereto, on a paper medium.

11. A lifting device according to claim 1, wherein said laser scanner is connected to a digital data recording unit.

12. A lifting device according to claim 1, wherein said laser scanner is connected to a portable electronic device.

13. A lifting device according to claim 1, wherein said laser scanner is of a point laser type.

14. A lifting device according to claim 1, wherein said laser scanner is of a stripe of light type.

15. A lifting device according to claim 6, wherein said laser scanner is connected to a vehicle wheel alignment machine, and data detected by the laser scanner is used by the vehicle wheel alignment machine to carry out its designated operations.

16. A lifting device according to claim 11, wherein the digital data recording unit is a database.

17. A lifting device according to claim 12, wherein the portable electronic device is a smartphone or tablet.

* * * * *